J. S. HILL.
FEED WATER HEATING SYSTEM.
APPLICATION FILED JULY 1, 1919.
1,369,759.
Patented Feb. 22, 1921.
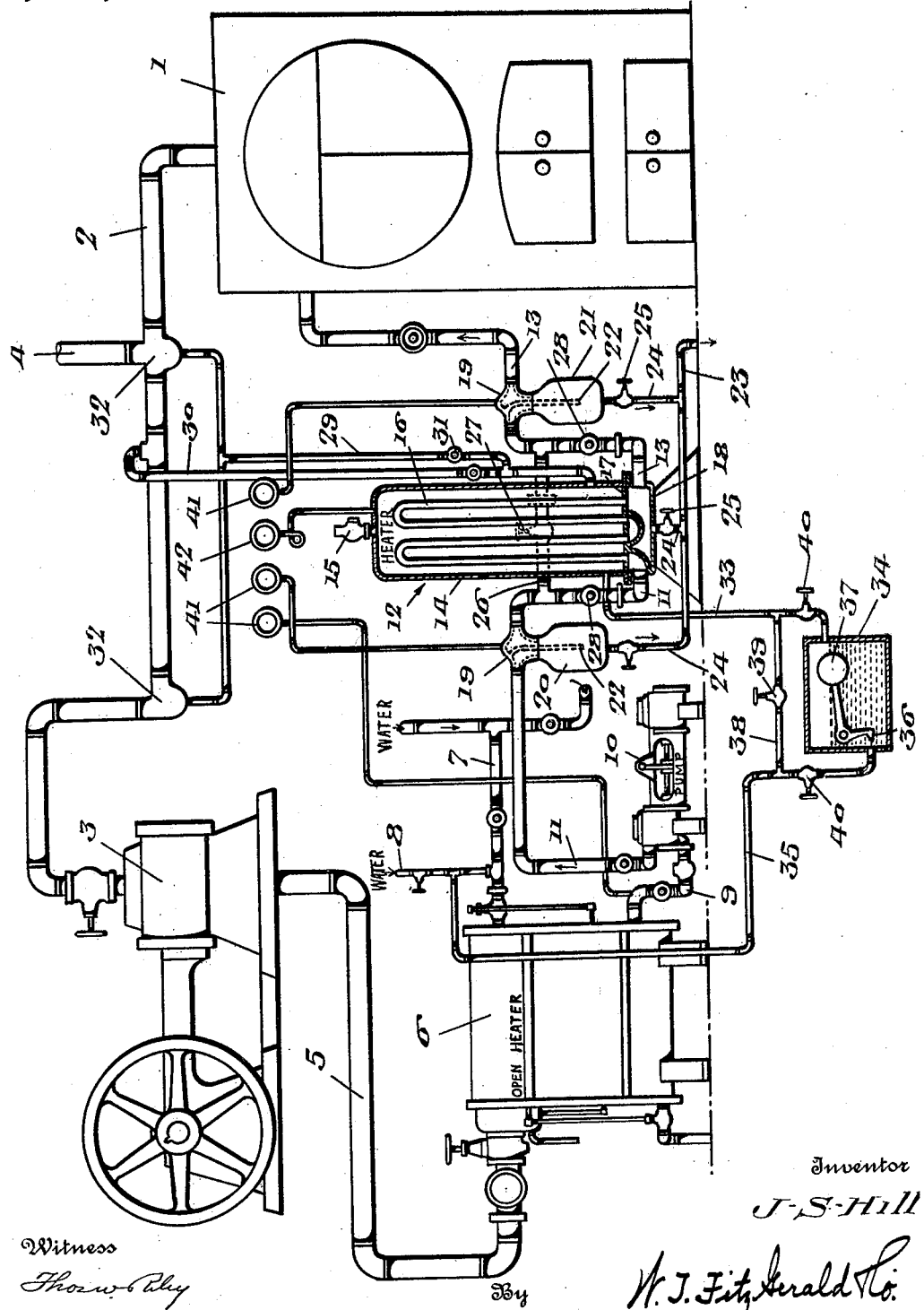
Witness
Thos. W. Riley
Inventor
J. S. Hill
By W. J. Fitzgerald & Co.
Attorney

UNITED STATES PATENT OFFICE.

JOSEPH S. HILL, OF WASHINGTON, DISTRICT OF COLUMBIA.

FEED-WATER-HEATING SYSTEM.

1,369,759.  Specification of Letters Patent.  Patented Feb. 22, 1921.

Application filed July 1, 1919. Serial No. 307,956.

*To all whom it may concern:*

Be it known that I, JOSEPH S. HILL, a citizen of the United States, residing at Washington, District of Columbia, have invented certain new and useful Improvements in Feed-Water-Heating Systems; and I do hereby declare the following to be a full, clear, and exact description of the invention, such as will enable others skilled in the art to which it appertains to make and use the same.

The present invention relates to a feed water heating system, and aims to provide a novel and improved apparatus for supplying feed water to a boiler and preheating the feed water so that it enters the boiler near boiler temperature.

It is the object of the invention to provide such a system having novel and improved features of construction and utilizing an open feed water heater and a closed feed water heater in combination in such a way as to obtain maximum efficiency with a minimum fuel consumption.

A further object is the provision in such an apparatus of novel means for arresting and catching sediment, scale-producing matter and other foreign matter contiguous to the closed heater so that said foreign matter can be blown out, to reduce to a minimum if not entirely eliminate the formation of scale in the boiler, thereby increasing the efficiency of the boiler.

A still further object is the provision in such a system of means for returning the water of condensation in the closed heater to the open heater so as to return as a part of the feed water.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein the figure is a diagrammatical view of the system.

The system embodies any suitable type of boiler 1, which furnishes steam that flows through the supply pipe 2 to the steam engine 3 or other device using the steam for heat or power, and said supply pipe 2 can have one or more branches 4 to supply a number of engines, radiators, or other steam-operated or heated devices. From the engine 3 and other devices using the steam, the steam flows through a return or exhaust pipe 5 and discharges into an open heater 6 of any suitable type. A water return pipe 7, such as leading from radiators, furnishes water which flows into the open feed water heater 6, and fresh water can be admitted into said heater through a water supply pipe 8. The heater 6, of which there are a number of various types in use, discharges the steam and water into a common chamber, where they are mixed, in close contact, thereby heating the water which discharges through a pipe 9 into a force pump 10, that delivers the water through a pipe 11. From the pipe 11, the feed water flows through a closed feed water heater 12 of any suitable style, and from said heater, the water passes through the pipe 13 back into the boiler. The pump 10 operates to pump the water from the open heater 6 and through the closed heater 12, whereby the water receives its initial heat in the open heater 6 and subsequently is heated to a higher temperature in the closed heater in which the water is heated almost to the temperature of the water and steam in the boiler. The water and steam thus flows in a circuit, passing from the boiler through the engine or other means employing the steam for power or heat, and then exhausting or passing into the open heater from which the feed water flows under the action of the pump 10 through the closed heater to pass into the boiler at almost boiler temperature.

A conventional form of closed heater 12 is shown, the same embodying an upright shell 14, provided at its upper end with a safety valve 15, and feed water tubing or coils 16 of any suitable form are disposed within said shell, and communicate through a lower partition 17 in the shell, the receiving ends of said coils or tubing communicating with the pipe 11, and the discharge ends communicating with the pipe 13, and the shell 14 having a bowl or sump 18 below the partition 17 into which the discharge end of the coil 16 empties and with which the pipe 13 communicates to receive the water from said coil. Thus, the feed water flows from the pipe 11 through the coil or tubing 16 into the bowl 18 and then into the pipe 13, and said shell 14 is filled with water of condensation and steam surrounding the coil 16 to heat the feed water to a temperature almost equal to that of boiler temperature. The steam is under boiler pressure in the shell 14, for which reason the safety valve 15 is provided.

In order to take advantage of the use of the closed heater in the feed water conduit, for the purpose of eliminating the formation of scale in the boiler, couplings 19 are interposed in the pipes 11 and 13 immediately adjacent to the closed heater, and chambers 20 and 21 are suspended from said couplings, in communication with the respective pipes 11 and 13. These chambers serve to arrest and catch any sediment, scale producing matter and other extraneous substances passing with the feed water into and out of the closed heater. Couplings 19 have baffles 22 extending downwardly into the chambers 21, compelling the water and steam to flow downwardly into said chambers in passing therethrough, thereby assuring of the foreign matter dropping to the bottom of the chambers. Importance is attached to the location of the chambers 20 and 21 in the apparatus, it being noted that the chamber 20 is located at the point of lowest temperature, while the chamber 21 is located at the point of highest temperature of the feed water. Thus, the feed water in flowing from the open heater through the pump 10 will decrease slightly in temperature, and the chamber 20 is located as near as possible to the closed heater 12 where the temperature of the feed water is at its lowest. Then, the feed water in passing through the closed heater is at its maximum temperature where it discharges from the closed heater, at which point the chamber 21 is located as near to the closed heater as possible in practice. In this way, the two separating chambers 20 and 21 receive the feed water at minimum and maximum temperatures on its way to the boiler, so that the scale-forming deposits will be caught in said chambers, thereby reducing to a minimum if not entirely eliminating the formation of scale in the boiler, as has been proven in actual operation. The use, therefore, of the separating chambers 20 and 21 in association with the closed heater 12 is thus productive of decidedly beneficial results, eliminating the frequent cleaning of the boiler, by the elimination of scale, and increasing the efficiency of the boiler.

A blow-off pipe 23 is provided, the same having branches 24 connected to the bottoms of the chambers 20 and 21 and bowl 18, said branches having controlling valves 25, so that said branches can be opened at intervals, whereby the sediment and accumulation in said chambers and bowl will be blown down through the blow-off pipe, thereby ridding the system of the foreign matter.

A by-pass pipe or shunt 26 connects the pipes 11 and 13 between the chambers 20 and 21, and has a normally closed valve 27, which can be opened for cutting out the closed heater 12, when repairs are necessary, said pipes 11 and 13 having valves 28 between the pipe 26 and closed heater for shutting off the flow of feed water through the closed heater, when the valve 27 is opened. The pipes 2, 5, 9 and others also have suitable controlling valves as usual, and the pipes 7 and 8 have valves for controlling the supply of water into the open heater 6.

The closed heater 12 is supplied with drip water and steam through pipes 29 and 30 connected through a common connection with the side wall of the shell 12 at a point above the partition 17 forming the bottom of the steam space in said shell surrounding the coil 16. These pipes 29 and 30 have suitable controlling valves 31, to regulate the flow of drip water and steam into the closed heater. The pipe 29 has branches connected to the drip chambers 32 in the steam supply pipe 2, and connected to other points of the steam supply conduit in practice, at low points thereof, whereby any water of condensation in the steam supply pipe will be caught in the drip chambers 32 and will flow through the pipe 29 into the steam space of the closed heater, to assist in heating the feed water, and to also remove the drip water from the steam conduit. The steam pipe 30 is connected to the steam supply pipe 2 to receive steam therefrom, but it has been found in practice that the pipe 30 need not ordinarily be opened, since sufficient steam is delivered through the pipe 29 with the water of condensation or drip to heat the closed heater sufficiently for the purposes. In this way, the drippings and steam from the supply pipe 2 pass into the steam space or chamber of the closed heater for heating the feed water flowing therethrough, thereby not only discharging the drip water from the pipe 2, but putting same to beneficial use together with the steam which passes with the drip water into the closed heater.

In order to discharge the water of condensation from the steam chamber of the closed heater 12, a pipe 33 is connected to the wall of the shell 14 below the level of the lower end of the connection of pipes 29 and 30 with said shell, and slightly above the partition 17, so that the water accumulating in the shell 14 will pass downwardly through the pipe 33 into a trap 34 to which said pipe is connected. A pipe 35 leads from said trap to deliver the water therefrom into the open heater 6, said pipe 35 being connected to the pipe 8 or at any other suitable point to deliver the water from the trap 34, so as to pass into the open heater. This trap 34 has a valve 36 for closing the outlet through the pipe 35, and has a float 37 to open the valve 36 when the water level rises to a predetermined distance in the chamber of the trap, so that the water will be forced out through the pipe 35 into the open heater. In this way, the water flows from the steam chamber of the closed heater into the trap 34, and from the trap is returned into the open heater to pass from said heater as a part of the feed water. In order that the trap 34 can be cut out, for purpose of repair, a by-pass pipe 38 connects the pipes 33 and 35 and has a valve 39 which can be opened, while valves 40 in the pipes 33 and 35 between the pipe 38 and trap 34 are closed.

As a means for obtaining a record of the operation and the efficiency of the system, recording thermometers 41 are connected to the couplings 19 and pipe 9 to indicate and record the temperature of the feed water where it leaves the heater 6, where it enters the heater 12, and where it leaves the heater 12. A recording pressure gage 42 is also connected to the shell 14 of the heater 12 to make a record of the steam pressure.

Briefly stated, the advantages of the present system are: (1) The use of the closed heater 12 in the feed water conduit between the open heater 6 and boiler, using the drip water and steam from the steam supply pipe 2 for heating the feed water to almost boiler temperature. (2) The relation of the separating chambers 20 and 21 with the closed heater for the passage of feed water through said chambers at minimum and then maximum temperature whereby to remove practically all scale-forming matter from the feed water before it enters the boiler. (3) The delivery of the water of condensation from the closed heater into the trap 34, from which the water is automatically returned to the open heater 6.

This apparatus has proven, from actual installation and tests, to provide a material saving in fuel, as well as reducing to a minimum the formation of scale in the boiler, thereby providing for increased efficiency in important particulars.

Having thus described the invention, what is claimed as new is:—

1. The combination of a boiler, a steam consuming device, a supply pipe connecting said boiler and device, an open feed water heater, a pipe delivering the exhaust from said device into the open feed water heater, a feed water conduit leading from said heater to the boiler, a closed feed water heater including a shell and a water passage therein disposed in said feed water conduit, a pipe connected to said shell for supplying steam, a pump for pumping the water from the open heater through the closed heater, means for the discharge of water of condensation from said shell, and separating means in the water conduit adjacent to the closed heater for the deposit of foreign matter.

2. The combination of a boiler, a steam consuming device, a supply pipe connecting said boiler and device, an open feed water heater, a water pipe leading to the open heater, a pipe delivering the exhaust from said device into said open heater, a feed water conduit leading from the open heater to the boiler, a closed feed water heater including a shell and a coil within the shell disposed in said conduit, a pump for pumping water from the open heater through the closed heater, a pipe connecting said shell and supply pipe, and automatic means for the delivery of water of condensation from said shell into the water pipe of the open heater.

3. The combination of a boiler, a steam consuming device, a supply pipe connecting said boiler and device, an open feed water heater, a water pipe leading to the open heater, a pipe delivering the exhaust from said device into said open heater, a feed water conduit leading from the open heater to the boiler, a closed feed water heater including a shell and a coil within the shell disposed in said conduit, a pump for pumping water from the open heater through the closed heater, a pipe connecting said shell and supply pipe, a trap connected to said shell to receive water of condensation therefrom and connected to the open heater to deliver water thereto, and means within the trap for automatically controlling the flow to the water pipe of the open heater.

4. The combination of a boiler, a steam consuming device, a supply pipe connecting said boiler and device and having a drip chamber, an open feed water heater, a pipe delivering the exhaust from said device into the open heater, a feed water conduit leading from the open heater to the boiler, a closed heater embodying a shell and a coil therein interposed in said conduit, a pipe leading from said drip chamber into said shell to drain water of condensation from the supply pipe into the closed heater, a pump for pumping the feed water from the open heater through the closed heater, and means for the discharge of the water of condensation from said shell.

5. The combination of a boiler, a steam consuming device, a supply pipe connecting said device and boiler, an open feed water heater, a pipe delivering the exhaust from said device into said open heater, a feed water conduit leading from said open heater to the boiler, a closed heater including a shell and a coil therein disposed in said conduit, a pipe connecting said shell and supply pipe, a pump for pumping the water from the open heater through the closed heater, and a pair of separating chambers connected in said conduit immediately adjacent to the closed heater at the water inlet and outlet thereof.

6. The combination of a boiler, an open feed water heater, a closed feed water heater including a shell and a coil therein, pipes connected to said coil, one leading to the boiler, and the other leading from the open heater, a pump for pumping the water from the open heater through said pipes and closed heater coil, separating chambers connected to said pipes immediately adjacent to the closed heater at the inlet and outlet thereof, and blow off means connected to the bottoms of said chambers.

In testimony whereof I have signed my name to this specification.

JOSEPH S. HILL.